S. S. WILLIAMSON.
FLUSH TANK VALVE.
APPLICATION FILED JULY 17, 1917.
1,304,432.
Patented May 20, 1919.
2 SHEETS—SHEET 1.
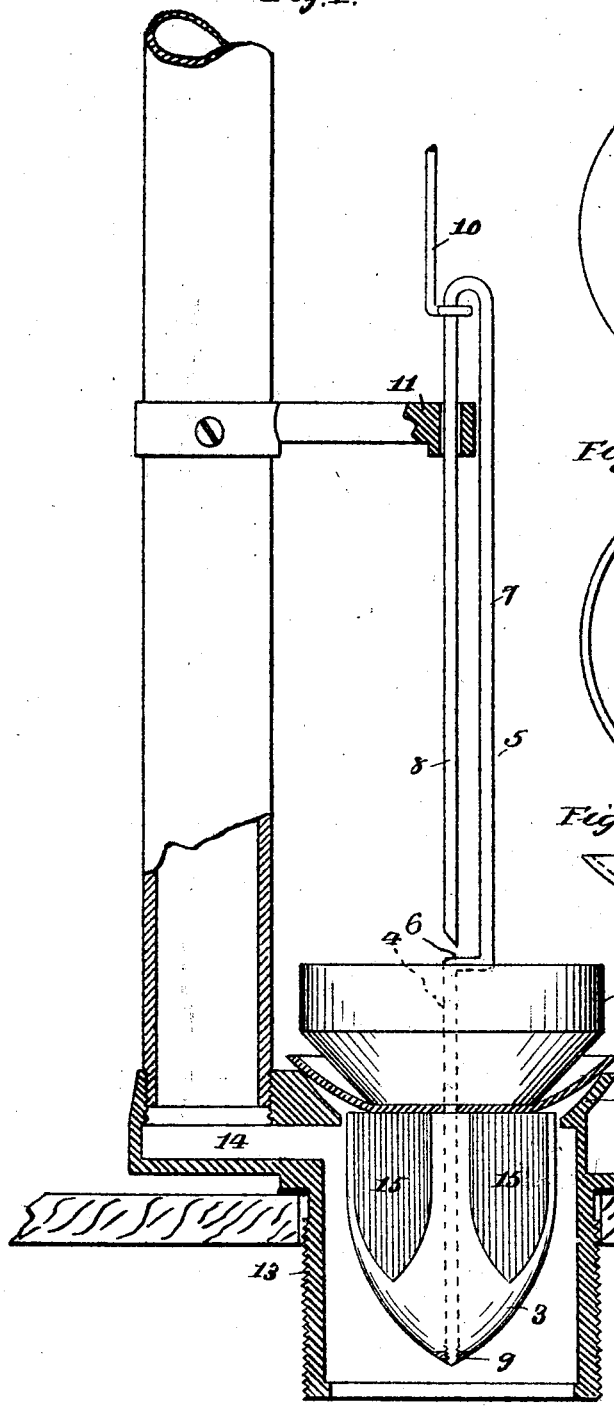
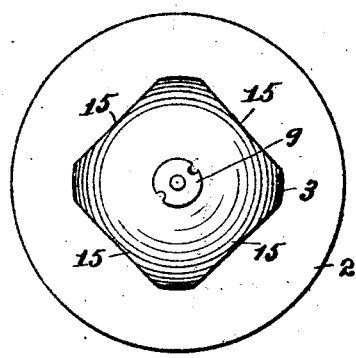
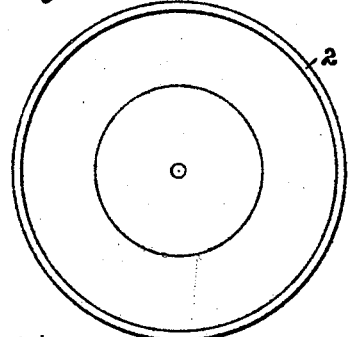
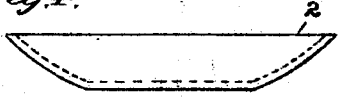
Samuel S. Williamson
Inventor

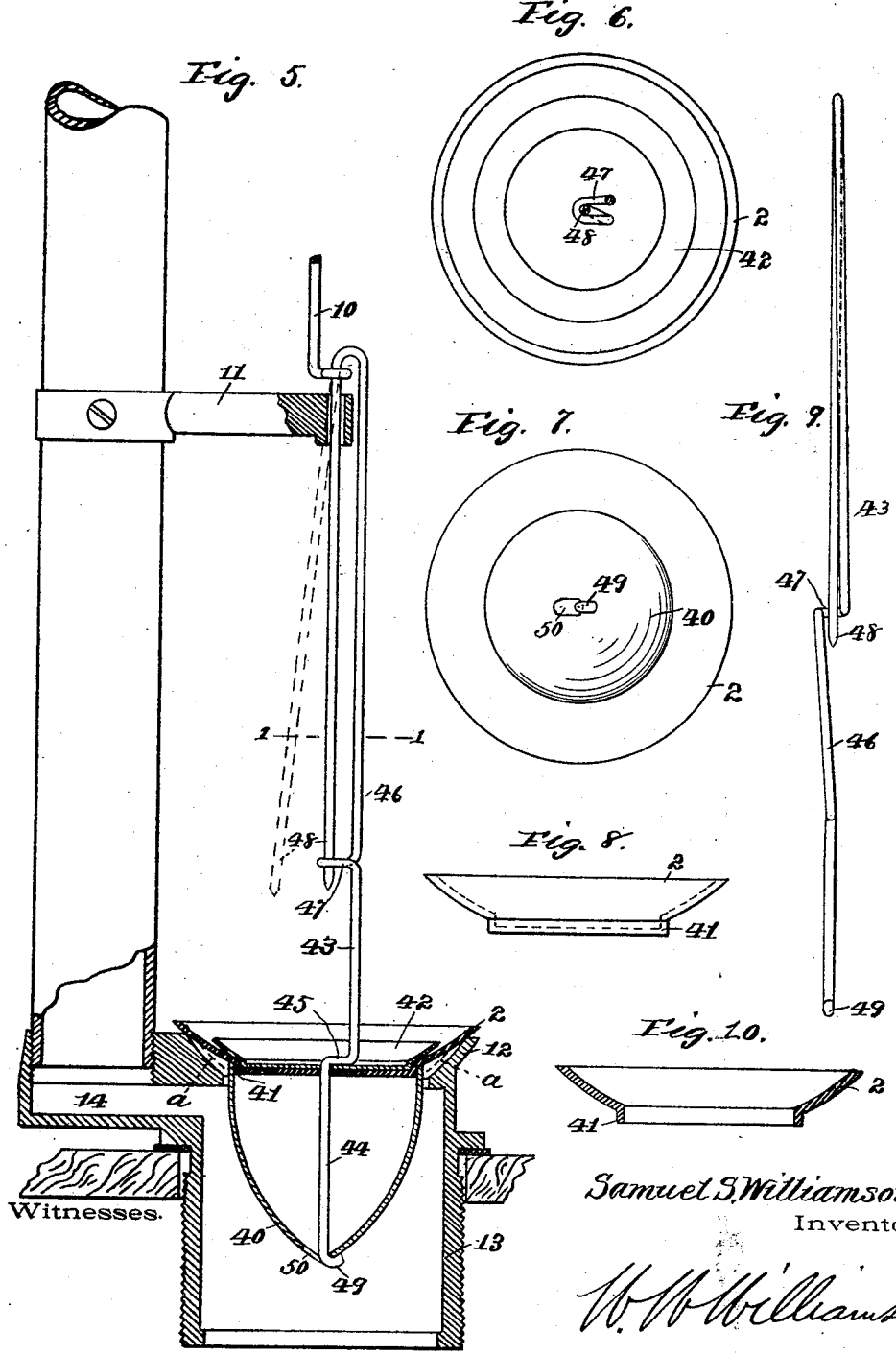

UNITED STATES PATENT OFFICE.

SAMUEL S. WILLIAMSON, OF PHILADELPHIA, PENNSYLVANIA.

FLUSH-TANK VALVE.

1,304,432.  Specification of Letters Patent.  Patented May 20, 1919.

Application filed July 17, 1917. Serial No. 181,046.

*To all whom it may concern:*

Be it known that I, SAMUEL S. WILLIAMSON, a citizen of the United States, residing at Philadelphia, in the county of Philadelphia and State of Pennsylvania, have invented new and useful Improvements in Flush-Tank Valves, of which the following is a specification.

My invention relates to a certain new and useful improvement in flush tank valves and has for its object to provide a simple and effective device of this description which will overcome the disadvantages of the present day flush valve, by making an absolutely sure seal upon the valve seat, being accurately guided at top and bottom while leaving a free outlet for the overflow.

With these ends in view, my invention consists in certain details of construction and combination of elements hereinafter described, reference being had to the drawings, and then specifically designated by the claims.

Figure 1, is an elevation of one form of my invention, the rubber valve disk being in section, the device being shown in its normal position relative to the ordinary valve seat and stand pipe.

Fig. 2, is a bottom plan view of the device shown in Fig. 1.

Fig. 3, is a plan view of the rubber valve disk.

Fig. 4, is a side elevation of the valve disk.

Fig. 5, is a view similar to Fig. 1 of at present my preferred construction in which a hollow float is used and a latch loop for holding the prong in locked alinement and serving as a stop for limiting the upward movement of the valve.

Fig. 6, is a section at the line 1—1 of Fig. 5.

Fig. 7, is a bottom plan of the valve.

Fig. 8, is a side elevation of the valve disk.

Fig. 9, is a view of the bail at right angles to Fig. 5.

Fig. 10, is a section of a modified form of valve disk.

In carrying out my invention as here embodied in Figs. 1 to 4 inclusive, 1 represents a float which serves the purpose of a stop shield for limiting the downward movement of the valve, preventing the latter from being forced through the valve seat. To the bottom of this shield is secured the rubber valve disk 2, the latter being dish shaped as clearly shown.

3 is another float which is utilized to secure the valve disk to the bottom of the shield float by the shank 4 of the bail 5. This bail is composed of a single piece of wire, so bent as to produce the shank 4, off set 6, upright 7 and prong 8. The shank passes through the shield and float and has a nut 9 run on its threaded end for drawing the parts together and clamping the central portion of the valve disk securely in place, the off set serving as a shoulder to bear upon the shield.

Another object of the off set is to carry the upright 7 off the center of the device in order that the prong 8 may extend central thereof. The prong 8 may be sprung sidewise in order that its free end may be readily threaded through the edge of the ordinary lift wire 10 and bracket 11. This makes the device readily attachable to the ordinary fixtures without removing the bail, as has heretofore been necessary. The float 3 serves the important function of guiding the valve in its downward movement in order that the valve disk 2 may at all times be properly seated; this guidance being effected by the float passing through the valve seat and into the spud 13.

In order that the float 3 may have a close running fit through the valve seat and at the same time not unduly obstruct the passageway 14 for the overflow, I flatten the sides thereof as indicated at 15. As the float 3 is entirely out of the water of the tank when the valve is seated, it serves as a weight to assist in more firmly seating the valve disk, yet when the valve is lifted and this float passes into the water, it supplies an important part of the total buoyancy of the valve, keeping the valve open until the proper low level of water has been reached in the tank.

As shown, the lower portion of the shield float 2 is in the form of an inverted truncated cone, so as to give ample clearance above the valve disk for the free action of water pressure upon the inside of this disk to force it upon its seat, and as this disk is preferably made of soft flexible material, this insures a perfect seal between it and the valve seat, which is the primary object of such valves.

By clamping the valve disk between the shield 1 and the float 3 the liability of the disk becoming dislocated or leaking from the "growing" of the rubber is overcome.

In Figs. 5 to 10 I have shown what I deem at present to be the preferred form of my invention, which consists of a hollow float 40, its upper end being open to form a mouth for the reception of the hub 41 of the valve disk 2, said disk being flared outward from the hub as clearly shown, adapting it to be forced downward into the valve seat and conform to the contour thereof as indicated by the dotted line A. This valve disk may have a closed bottom as shown in Fig. 5, or its bottom may be open as shown in Fig. 10. 42 represents the stop plate or shield which is dish shaped and has a depressed bottom which fits inside the hub 41 after the manner of a can cover, holding the valve disk in place upon the float. The flange of this shield is of sufficient diameter to stop the valve from being forced through the valve seat.

43 represents the bail, which in this case consists of a single piece of wire so bent as to form a shank 44, an offset 45, an upright 46, a latch loop 47 and latch prong 48, which latter when unlatched is intended to spring outward as shown in dotted lines in Fig. 5, so as to facilitate threading it through the lift wire 10 and the guide hole in the bracket 11. The shank of this bail passes through shield and float and is provided with a hook 49 which engages with the bottom of the float securing the parts together; the off set 45 bearing upon the upper side of the shield.

In order that the device may be readily assembled, a slot 50 is formed in the bottom of the float of sufficient size to permit the free passage of the hook 49 prior to its being snapped in place.

The float may be of any suitable material such as celluloid, aluminum or copper, the former having many advantages.

The latch loop 47 serves the additional purpose of limiting the upward movement of the bail since when the said bail has reached the proper upward limit this loop will come in contact with the under side of the bracket 11, as will be readily understood.

When the latch prong 48 has been threaded through the lift wire and guide bracket and its free end latched into the loop 47, said prong will be held in vertical alinement with the vertical axis of the valve to give said valve the proper guidance in its vertical movements.

In practice I have found that this form of my invention is cheap of construction and effective in operation.

Of course, other variations of construction may be made within the scope of the claims without departing from the spirit of my invention.

Having thus fully described my invention what I claim as new and patentable is:—

1. A flush tank valve comprising a flexible dish shaped disk having a hub formed therewith, a hollow float into the mouth of which said hub fits, a stop shield having a depressed bottom, said depression fitting inside the said hub, and a bail, the shank of which passes through the above named elements and secures the same together.

2. A flush tank valve comprising a flexible member disk having a hub formed therewith, a hollow float into the mouth of which said hub fits, a stop shield having a depressed bottom, said depression fitting inside the hub, and a bail comprising an off set for bearing upon the top of the stop shield, a shank passing through the shield flexible member and float and removably attached to the bottom of the float, an upright section, a loop formed in this upright and a prong for engagement with the lift wire and guide bracket of the tank, the free end of said prong adapted to latch into said loop.

3. A flush tank valve consisting of a flexible disk adapted to be closed upon the valve seat, a float secured to the under side of said disk the sides thereof being flattened and a bail projecting upward from the valve.

4. In combination, a flush tank valve and a bail, the latter comprising a shank, an offset, an upright, a latch prong and a loop, said loop serving to latch said prong in an operative position and also as a stop to limit the upward movement of the valve.

In testimony whereof, I have hereunto affixed my signature.

SAMUEL S. WILLIAMSON.